3,767,667
PROCESS FOR PREPARING 1H-TETRAZOLE
COMPOUNDS
Takashi Kamiya and Yoshihisa Saito, Suita, Japan, assignors to Fujisawa Pharmaceutical Co., Ltd., Osaka, Japan
No Drawing. Filed Oct. 7, 1971, Ser. No. 187,561
Int. Cl. C07d 55/56
U.S. Cl. 260—308 D                          7 Claims

ABSTRACT OF THE DISCLOSURE

A process for preparing 1H-tetrazole compounds of the formula:

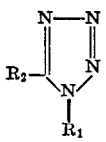

wherein $R_1$ and $R_2$ are each hydrogen or a possible substituent, which comprises reacting an amine compound of the formula:

$$R_1-NH_2$$

wherein $R_1$ is as defined above, or its salt with an orthocarboxylic acid ester of the formula:

$$R_2C(OR_3)_3$$

wherein $R_3$ is lower alkyl and $R_2$ is as defined above, and a hydrazoic acid salt.

---

This invention relates to a new process for preparing 1H-tetrazole compounds of the formula:

wherein $R_1$ and $R_2$ are each hydrogen or a possible substituent, and the possible substituent means lower alkyl substituted or not substituted with carboxyl, esterified carboxyl, carbamoyl, hydroxy, amino, mono or di-(lower)alkylamino, lower alkoxy or halogen, aryl or ar(lower)alkyl.

According to this invention, the 1H-tetrazole compound (I) is prepared by reaction an amine compound of the formula:

$$R_1-NH_2 \quad (II)$$

wherein $R_1$ is as defined above, or its salt with an orthocarboxylic acid ester of the formula:

$$R_2C(OR_3)_3 \quad (III)$$

wherein $R_3$ is lower alkyl and $R_2$ is as defined above, and a hydrazoic acid salt.

In the description hereinabove and hereinbelow, the term "lower" means a straight or branched carbon chain of one to six carbon atoms; "alkyl" means methyl, ethyl, propyl, isopropyl, butyl, isobutyl, t-butyl, pentyl, hexyl, etc.; "esterified carboxyl" means lower alkoxycarbonyl such as methoxycarbonyl, ethoxycarbonyl, propoxycarbonyl, butoxycarbonyl, t-butoxycarbonyl, etc. or ar-(lower)alkoxycarbonyl such as benzyloxycarbonyl, phenethyloxycarbonyl, etc.; "mono(lower)alkylamino" means methylamino, ethylamino, propylamino, isopropylamino, etc.; "di(lower)alkylamino" means dimethylamino, diethylamino, dipropylamino, methylethylamino, etc.; "lower alkoxy" means methoxy, ethoxy, propoxy, isopropoxy, butoxy, isobutoxy, t-butoxy, etc.; "halogen" means fluorine, chlorine, bromine, iodine; "aryl" means phenyl, tolyl, xylyl, mesityl, naphthyl, biphenylyl, etc. and "ar(lower)alkyl" means benzyl, tolylmethyl, xylylmethyl, phenethyl, tolylethyl, α-methylbenzyl, α-methylphenethyl, etc.

The compounds (I) of this invention are known compounds and there are many known processes for preparing the same, among which some processes are described in Chemical Abstract 50, 3418 (1956), Journal of Organic Chemistry 21, 311–315 (1956) and Canadian Journal of Chemistry 47 813–819 (1969). All of the known processes have a disadvantage in that they need multiple steps to produce the compounds (I) and their operation procedures are complex and troublesome. This invention was made in order to overcome this disadvantage and in addition has advantages, in comparison with the known processes, in that (1) the object Compound I can be obtained in a remarkably good yield, as the process of this invention comprises a single step reaction; (2) the operation procedure is extremely simple, that is, the object Compound I can be obtained by only heating the mixture of the amine Compound II, the orthocarboxylic acid ester (III) and the hydrazoic acid salt, and (3) there is no need to use a poisonous gas of hydrazoic acid which is usually employed in the synthesis of tetrazole compounds.

This invention provides a new process for preparing the Compound I by reacting the amine Compound II with the orthocarboxylic acid ester III and the hydrazoic acid salt. In this invention, salts of the amine Compound II are exemplified with an inorganic acid salt such as hydrochloride, hydrobromide, nitrate, sulfate, etc. and an organic acid salt such as maleate, lactate, tartarate, citrate, etc. Examples of the hydrazoic acid salt are hydrazoic acid metal salts such as an alkali metal azide, e.g. lithium azide, sodium azide, potassium azide, etc.; an alkaline earth metal azide, e.g. magnesium azide, calcium azide, barium azide, etc. and the like.

The reaction of this invention is usually carried out in an organic acid such as acetic acid, propionic acid, etc. and other solvents inert to the reaction such as an alcohol, dimethylformamide, etc. are also employed. The reaction of this invention is ordinarily carried out under warming or under heating.

The object 1H-tetrazole compounds are the starting materials for preparing a useful antibiotic, such as, for example, 7-[2-(1H-tetrazole-1-yl)acetamido]-3-(2-methyl-1,3,4-thiadiazol - 5 - yl)thiomethyl - 3 - cephem-4-carboxylic acid (The Journal of Antibiotics 23, 131–203 (1970)).

This invention is further illustrated by the following examples.

EXAMPLE 1

A mixture of aniline hydrochloride (2.6 g.) and sodium azide (1.5 g.) in ethyl ortho-formate (5 cc.) and acetic acid (10 cc.) was heated at 70–75° C. with stirring for 2.5 hours. After the reaction terminated, the solvent of the mixture was distilled off and to the residue was added water to give crystals. The crystals were collected by filtration, washed with water and dried to give white crystals (2.76 g.) of 1-phenyl-1H-tetrazole, M.P. 64–65° C.

EXAMPLE 2

A mixture of ammonium chloride (2.67 g.) and sodium azide (3.5 g.) in ethyl ortho-formate (15 cc.) and acetic acid (15 cc.) was heated at 70° C. with stirring for 3 hours. After the reaction terminated, the solvent of the mixture was distilled off and to the residue was added acetone. An insoluble inorganic material was removed from the mixture by filtration. Acetone was distilled off to give crystals. The crystals were collected by filtration, washed with a small amount of benzene and dried to give crystals (3.1 g.). The crystals were recrystallized from acetic acid to give crystals of 1H-tetrazole, M.P. 153–155° C.

EXAMPLE 3

A mixture of glycine (1.5 g.) and sodium azide (1.5 g.) in ethyl ortho-acetate (5 cc.) and acetic acid (10 cc.) was heated at 70° C. with stirring for 3 hours. After the reaction terminated, the mixture was acidified by a 10% hydrochloric acid. The solvent of the mixture was distilled off and to the residue was added water to give crystals. The crystals were collected by filtration, washed with water and dried to give crystals (0.75 g.). The crystals were recrystallized from water to give crystals of 5-methyl-1H-tetrazole-1-acetic acid, M.P. 191–192° C.

EXAMPLE 4

A mixture of glycine (3.75 g.), sodium azide (3.9 g.) and ethyl ortho-formate (8.0 g.) in acetic acid (25 cc.) was heated at 80° C. with stirring for 2 hours. After the reaction terminated, the mixture was acidified with concentrated hydrochloric acid (5 cc.). The solvent of the mixture was distilled off and the residue was extracted with ethyl acetate (20 cc.) twice, while keeping hot. The ethyl acetate layers were joined together and the solvent was distilled off to obtain a faint yellow residue (4.3 g.). The residue was recrystallized from isopropanol to give crystals of 1H-tetrazole-1-acetic acid, M.P. 125–127° C.

EXAMPLE 5

A mixture of ethyl ester of glycine hydrochloride (14.0 g.), sodium azide (7.2 g.) and methyl ortho-formate (16.0 g.) in acetic acid (20 cc.) was heated at 70° C. with stirring for 2 hours. After the reaction terminated, the solvent of the mixture was distilled off and to the residue was added water to give an oil. The oil was extracted with chloroform and the extract was washed with water and dried. The chloroform of the mixture was distilled off to give an oil (13.7 g.) of ethyl 1H-tetrazole-1-acetate. The oil was cooled to give crystals, M.P. 32–34° C.

EXAMPLE 6

A mixture of 2-aminoisobutanol (4.5 g.) and sodium azide (3.5 g.) in ethyl ortho-formate (10 cc.) and acetic acid (25 cc.) was heated at 80° C. with stirring for one hour. After the reaction terminated, hydrochloric acid was added to the mixture and the solvent of the mixture was distilled off. To the residue was added ethanol. An insoluble inorganic material was removed from the mixture. The ethanol of the mixture was distilled off to give a colorless oil. Within several minutes, the oil was crystallized. The crystals were recrystallized from benzene to give crystals of β,β-dimethyl-1H-tetrazole-1-ethanol, M.P. 63–64° C.

We claim:

1. A process for preparing 1H-tetrazole compounds of the formula

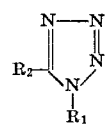

wherein $R_1$ is hydrogen, carboxy-lower alkyl, or carb-(lower)alkoxy-lower alkyl and $R_2$ is hydrogen or lower alkyl, which comprises reacting (a) an amine of the formula

or a salt thereof, wherein $R_1$ is the same as above, and (b) an orthocarboxylic acid ester of the formula

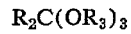

wherein $R_3$ is lower alkyl and $R_2$ is the same as above, with a salt of hydrazoic acid.

2. A process according to claim 1 wherein the salt of hydrazoic acid is sodium azide.

3. A process according to claim 2 wherein the salt of $R_1NH_2$ is the hydrochloride.

4. A process according to claim 3 wherein $R_1$ is hydrogen,
$R_2$ is hydrogen, and
$R_3$ is ethyl.

5. A process according to claim 2 wherein $R_1$ is carboxymethyl,
$R_2$ is hydrogen, and
$R_3$ is ethyl.

6. A process according to claim 2 wherein $R_1$ is carboxymethyl,
$R_2$ is methyl, and
$R_3$ is ethyl.

7. A process according to claim 3 wherein $R_1$ is carbethoxymethyl,
$R_2$ is hydrogen, and
$R_3$ is methyl.

References Cited

FOREIGN PATENTS 521,870   3/1931   Germany _____ 260—308 D

OTHER REFERENCES

De Wolfe, Carboxylic Ortho Acid Derivatives (Academic Press, 1970), pp. 178–184. OD 305A2D4.

Elderfield, Heterocyclic Compounds, vol. 8 (John Wiley & Sons, Inc., 1967) pp. 19–21. QD400E4.

ALTON D. ROLLINS, Primary Examiner